US005974016A

United States Patent [19]

Andrews et al.

[11] Patent Number: 5,974,016

[45] Date of Patent: Oct. 26, 1999

[54] DISC READER WITH AUTOMATIC CLOSING TRAY

[75] Inventors: Gregory Paul Andrews; Kin Chung Cheung, both of Rochester, Minn.

[73] Assignee: International Business Machines Corporation, Armonk, N.Y.

[21] Appl. No.: 08/866,741

[22] Filed: May 30, 1997

[51] Int. Cl.$^{6}$ .................... G11B 33/02

[52] U.S. Cl. .................... 369/77.1

[58] Field of Search .................... 369/77.1, 77.2, 369/75.1, 75.2, 178, 197, 33, 58; 360/99.02, 99.06

[56] References Cited

U.S. PATENT DOCUMENTS

| | | | |
|---|---|---|---|
| 4,625,304 | 11/1986 | Kanamaru et al. | 369/75.2 |
| 4,695,995 | 9/1987 | Koizumi | 369/75.2 |
| 4,701,902 | 10/1987 | Aoyagi et al. | 369/771.1 |
| 4,755,978 | 7/1988 | Takizawa et al. | 369/75.2 |
| 4,914,421 | 4/1990 | D'Alayer De Costemore D'Arc et al. | 369/77.2 |
| 4,979,160 | 12/1990 | Araki | 369/75.2 |
| 4,995,027 | 2/1991 | Aoyagi et at. | 369/77.1 |
| 5,150,340 | 9/1992 | Miura et al. | 369/33 |
| 5,243,475 | 9/1993 | Odashima et al. | 360/71 |
| 5,539,717 | 7/1996 | Choi | 369/77.2 |
| 5,574,711 | 11/1996 | Nakamichi | 369/77.1 |
| 5,761,167 | 6/1998 | Kim et al. | 369/58 |

*Primary Examiner*—Allen T. Cao
*Attorney, Agent, or Firm*—Joan Pennington; Owen J. Gamon

[57] ABSTRACT

A disc reader has a housing and a data disc loading tray movable between open and closed positions. A plurality of sensors at a nest in the tray sense the presence of a disc and whether the disc is correctly positioned in the nest. When the tray is open and a new disc is loaded into the nest, the tray is automatically closed after a relatively short time delay. When the tray is open and empty or open with an old disc in place, the tray is automatically closed after a relatively long time delay.

14 Claims, 3 Drawing Sheets

DISC READER WITH AUTOMATIC CLOSING TRAY

FIELD OF THE INVENTION

The present invention relates to data disc readers having disc trays for loading discs into an operating position, and more specifically to automatic closing of disc trays.

DESCRIPTION OF THE PRIOR ART

Compact disc (CD) players are widely used on modern computers. Such devices read data from a disc that is loaded into an operating position within the player. Some players can only play back or read data from the disc. Others are capable of both reading and writing data on the disc surface. The present invention may be applied to these types of CD players as well as to other data disc reading or writing devices including music and video disc readers. The term "data disc readers" as used herein is intended to include all devices of this character.

The typical CD player used with a computer or other data utilizing apparatus has a tray that receives a disc. The position of the tray is manually controlled by a pushbutton on the front of the player. The tray is normally in a closed or retracted position within the player. When the button is pushed, a motor moves the tray to an open or extended position where the user can place a disc onto a turntable surface or nest defined upon the tray. Then, when the user again pushes the button, the motor returns the tray to the retracted or closed position. In the closed position, the disc is in an operating position where it is rotated by the turntable in order that data can be read from the disc by a transducer.

The typical CD player has disadvantages resulting from manual, pushbutton control of the tray position. Time is wasted when one disc is removed and a new disc is loaded. Usually the user removes the new CD from its container and pushes the button to open the tray. The old CD is removed from the tray and the new CD is loaded onto the tray. The old CD is stored in its container. Finally the button is pushed to close the tray. More time is required as the player performs a routine of recognizing the new disc.

When the typical tray is in its extended, open position it blocks easy access to the operating pushbutton. The inconvenience of reaching around or under the tray to operate the button is a disadvantage. Also, because of the inconvenience, there is a tendency for the user to leave the tray open when the player is not in use. This can result in damage to the exposed, projecting, fragile tray. This can also result in the entry of dirt or dust into the unobstructed tray opening at the front of the player. Another disadvantage is that if the disc is not correctly positioned in the tray when the button is pushed to close the tray, the disc can be damaged.

It has been proposed to eliminate the loading tray and feed the disc directly into a slot in the front of the player. U.S. Pat. Nos. 4,701,902; 4,979,160 and 4,995,027 disclose disc players of this type. Although this approach eliminates some problems of the disc loading tray, other disadvantages can result because the disc is transported by drive rollers or other components that must engage the data surface of the disc. For demanding applications such as computer data storage, disc surface contact may not be acceptable.

It has also been proposed to sense the presence of a disc upon the tray and to move the tray from its open position to its closed position when a disc is sensed. A suggestion to this effect is found in U.S. Pat. No. 4,625,304. That patent proposes that some unspecified detector be used to detect a disc on the tray, and that a drive unit move the tray to the closed position either in response to disc detection or button operation. The system proposed by this disclosure is not capable of discriminating between correct and incorrect disc positioning in the tray and could cause damage to the player or disc by closing the tray with the disc in an incorrect position. Moreover, the disclosed system cannot automatically close the tray when it is left empty, and does not provide a way to control the tray so that an old disc can be removed and a new disc can be loaded.

SUMMARY OF THE INVENTION

A principal object of the present invention is to provide an improved disc reader with a disc loading tray that is closed automatically. Other objects are to provide a disc reader with a disc loading tray that is automatically closed when a disc is correctly positioned upon the tray but not when a disc is present in an incorrect position; to provide a disc reader with a disc loading tray that is closed after the tray is left open and empty or open and loaded with an old disc for a period of time; to provide a disc reader that automatically closes the disc loading tray a relatively short time after a new disc is loaded and a relatively longer time if an old disc is left in the tray or if the tray is left empty.

In brief, in accordance with the present invention, there is provided a disc reader for reading data from data discs. The disc reader includes a housing and a disc loading tray supported by the housing and defining a disc receiving nest. The tray is moveable relative to the housing between a closed position wherein the nest is located at an operating position within the housing and an open position wherein the nest is accessible from the exterior of the housing. Means carried by the tray and located at the nest senses when a disc is correctly positioned upon the nest. The tray is moved from the open to the closed position in response to the sensing by the sensing means of a correctly positioned disc.

BRIEF DESCRIPTION OF THE DRAWING

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
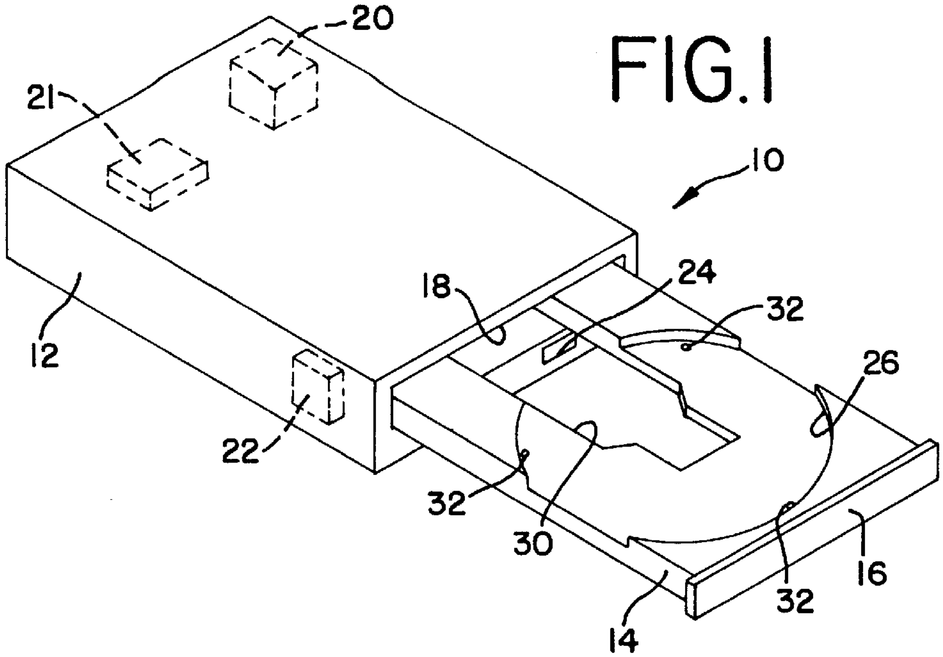
FIG. 1 is a partly diagrammatic isometric view of a disc reader with an automatic closing disc tray in accordance with the present invention.

Having reference now to the drawings, and initially to FIG. 1, there is illustrated a disc reader or CD player generally designated by the reference character and constructed in accordance with the principles of the present invention. The reader 10 includes a housing 12 supporting a disc loading tray 14. The tray 14 is movable relative to the housing 12 between the illustrated open or extended position and a closed or retracted position. In the closed position, a drawer front 16 mates flush with and closes a tray opening 18 at the front of the housing 12.

Within the housing 12 are a tray drive motor 20 for moving the tray between positions, a tray control microprocessor 21 and a tray position sensor 22 for sensing whether the tray is open or closed. If desired the sensor 22 can be integrated with the motor or motor control system rather than being a discrete mechanism. Numerous variations of the conventional CD player are well known, and a detailed description of these and other internal components is not necessary to an understanding of the present invention.

A pushbutton 24 is located at the front of the housing 12 below the opening 18. When the tray 14 is open and the button 24 is pressed, the motor 20 moves the tray to the closed position. When the tray 14 is closed and the button 24 is pressed, the motor 20 moves the tray to the open position. When the tray 14 is open as seen in FIG. 1, the pushbutton 24 is awkward to reach because easy access is blocked by the projecting tray.

Figure 2:
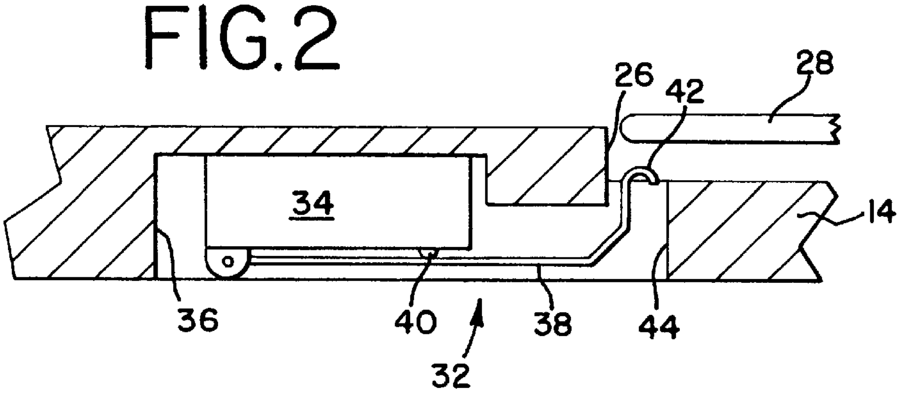
FIG. 2 is a greatly enlarged, fragmentary, sectional view of one disc sensing device of the reader of FIG. 1.

The tray 14 includes a nest 26 shaped to receive a data disc 28 (FIG. 2). An access opening 30 in the tray permits a turntable mechanism within the housing 12 to rotate the disc when the tray is closed. The opening 30 also permits the disc to be read by a transducer within the housing when the tray is closed. In other known CD player configurations, the turntable and transducer can be mounted on the movable tray rather than within the housing. In this case the turntable can be part or all of the disc receiving nest. The present invention provides advantages with both variations.

In accordance with the invention, a plurality of disc sensors 32 are located at the tray nest 26. These sensors 32 provide an indication when a disc is present upon the tray 14, and provide a further indication when a disc is correctly positioned within the nest 26. In the arrangement of FIGS. 1 and 2, the sensors 32 are switch mechanisms.

In the preferred arrangement of FIGS. 1 and 2, three sensor switch mechanisms 32 are located at regular intervals around the periphery of the nest 26. When a disc 28 is lowered into the nest 26, as indicated by the arrows in FIG. 2, the disc contacts the switch mechanisms. The sensors 32 are located at the outer periphery of the nest 26 so that they do not contact the data storage region of the disc 28. If any of the switch mechanisms is operated, that is an indication that a disc is present upon the tray. If only one or two switch mechanisms are operated, that indicates that the disc is not correctly loaded into the nest. When the disc is correctly loaded, all three switch mechanisms are operated. If a disc is present but is not correctly positioned fully within the nest 26, closing of the tray 14 could result in damage to the disc or to the disc reader.

As seen in FIG. 2, each switch mechanism includes a switch housing 34 secured in a recess 36 in the bottom of the tray 14. A switch operating lever 38 is pivoted relative to the housing 12 and engages a switch operating button 40. The lever includes a tip portion 42 extending up into the nest 26 through an opening 44. When no disc contacts the tip 42, the lever 38 is in the upper position seen in FIG. 2 where it depresses the operating button 40 to place the switch in one of two alternate states. When a disc contacts the tip 42, the lever is moved down, the operating button 40 is disengaged, and the switch is placed in its other state.

Figure 3:
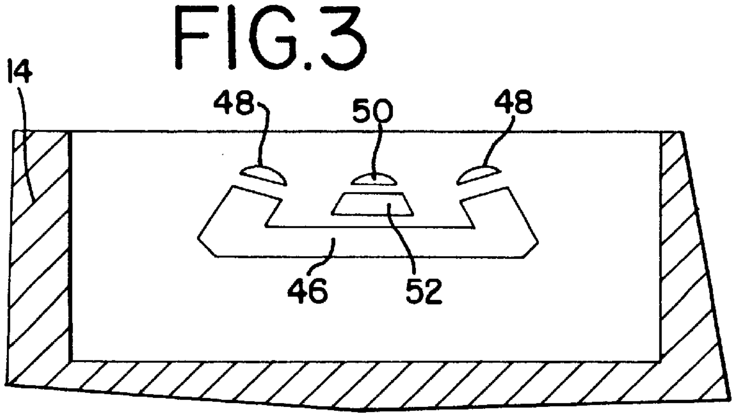
FIG. 3 is a greatly enlarged, fragmentary, sectional view of another embodiment of a disc sensing device for the reader of FIG. 1.

In FIG. 3 an alternative disc sensor construction designated as 32A is illustrated. The sensors 32A are optical detector modules embedded in translucent material in the surface of the tray 14, facing upwardly within the nest 26. Each module includes a generally U-shaped laser diode 46 directing light into the nest 26 disc through projector microlenses 48. When a disc is present in the nest directly above the detector, light is reflected. The reflected light is focused by a receptor microlens 50 onto a photodiode 52. The photodiode provides an output signal that indicates whether or not a disc is sensed. As in the FIG. 1 embodiment a plurality of detectors are used in order to provide not only an indication that a disc is present but also an indication that the disc is correctly positioned in the nest 26.

Figure 6:
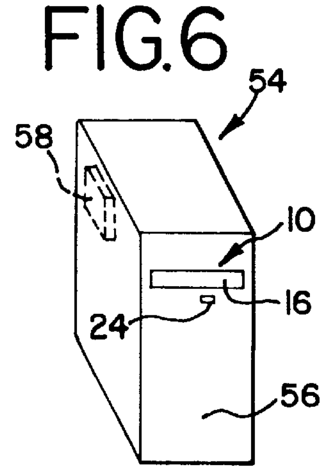
FIG. 6 is a partly diagrammatic isometric view of a computer having a disc reader in accordance with the present invention.

In FIG. 6 there is illustrated a computer 54 including a front face 56 easily accessible to a user. The disc reader 10 is mounted in the computer 54 with the drawer front 16 generally flush with the front face 56. The computer 54 includes a central processing unit in the form of a microprocessor 58 that uses data from the disc reader 10 and controls functions of components of the computer system including the disc reader 10. Alternatively if desired the disc reader 10 may be a stand alone unit connected by a suitable external cabling to the computer 54 or other data utilization device.

Figure 4:
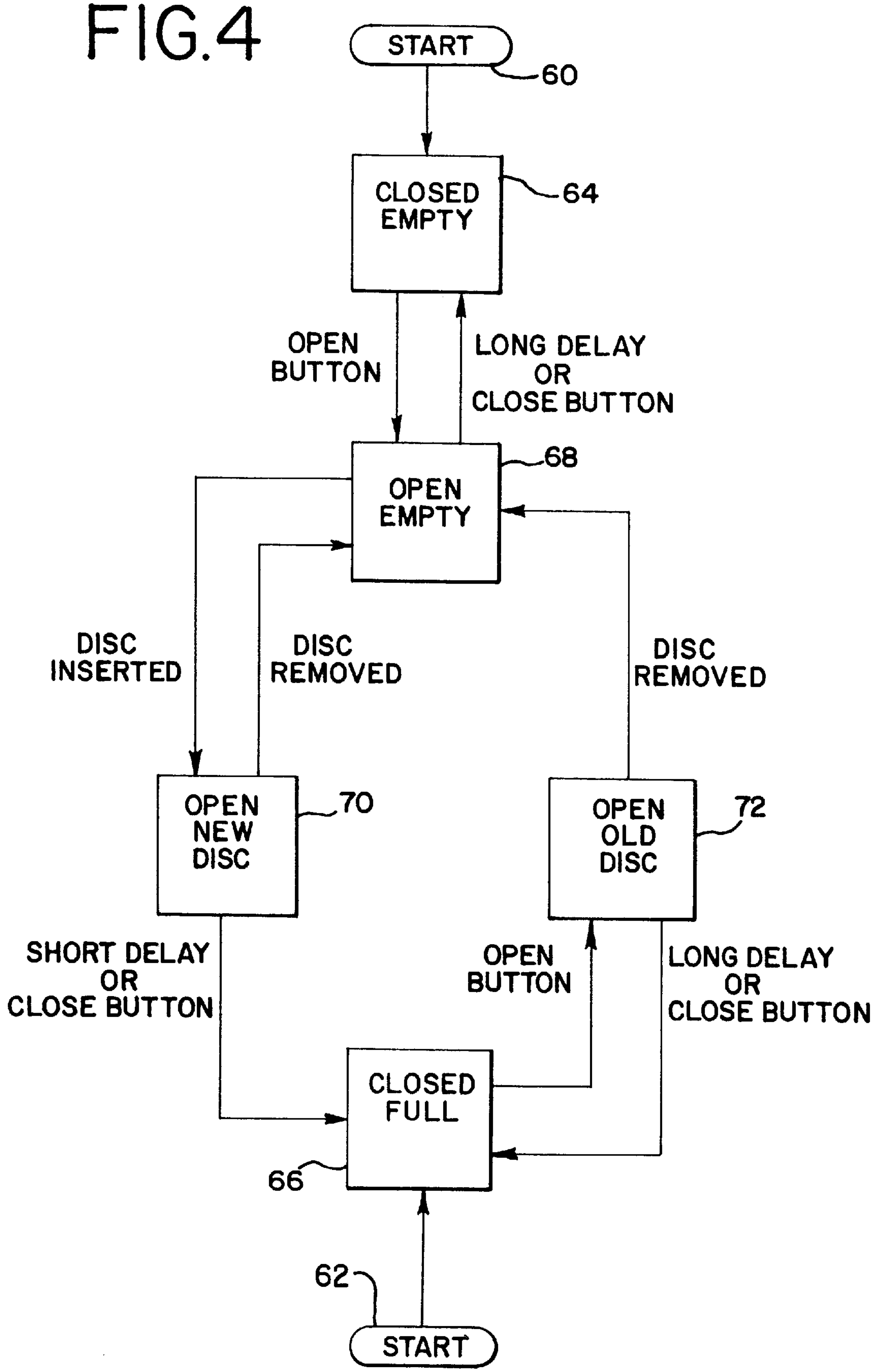
FIG. 4 is a schematic state diagram illustrating the relationships between the states of the automatic closing disc tray of the reader of FIG. 1.

Referring to FIG. 4, in accordance with the preferred embodiment the signals provided by the sensors 32 or 32A are used to automatically control the closing of the tray 14 so that it is not necessary for the user to press the pushbutton 24. The reader 10 starts in either block 60 or 62 with the tray closed. The tray can either be empty as indicated in block 64 or it can be full as indicated in block 66. Considering first the closed, empty state of block 64, when the pushbutton 24 is pressed, the tray moves to the open, empty state indicated in block 68. If no disc is present and sensed by sensors 32, the tray is automatically closed after a predetermined, relatively long time delay, and the state of the system returns to closed, empty as seen in block 64.

Alternatively, if a new disc is loaded onto the tray 14, then the state changes to open, new disc as seen in block 70. If the new disc is removed, the state returns to open, empty, block 68. If the new disc remains in place for a relatively short time delay period, the tray is automatically closed and the state changes to closed, full, block 66.

When the system starts in the closed, full state of block 66 and the pushbutton 24 is pressed to open the tray 14, the state changes to open, old disc as indicated in block 72. If the disc is removed, the state changes to open, empty, block 68, and either a new disc is inserted, block 70, or the tray is automatically closed after a relatively long delay, block 64. If the disc is not removed, the tray is automatically closed to the block 66, closed, full state after a relatively long delay.

Figure 5:
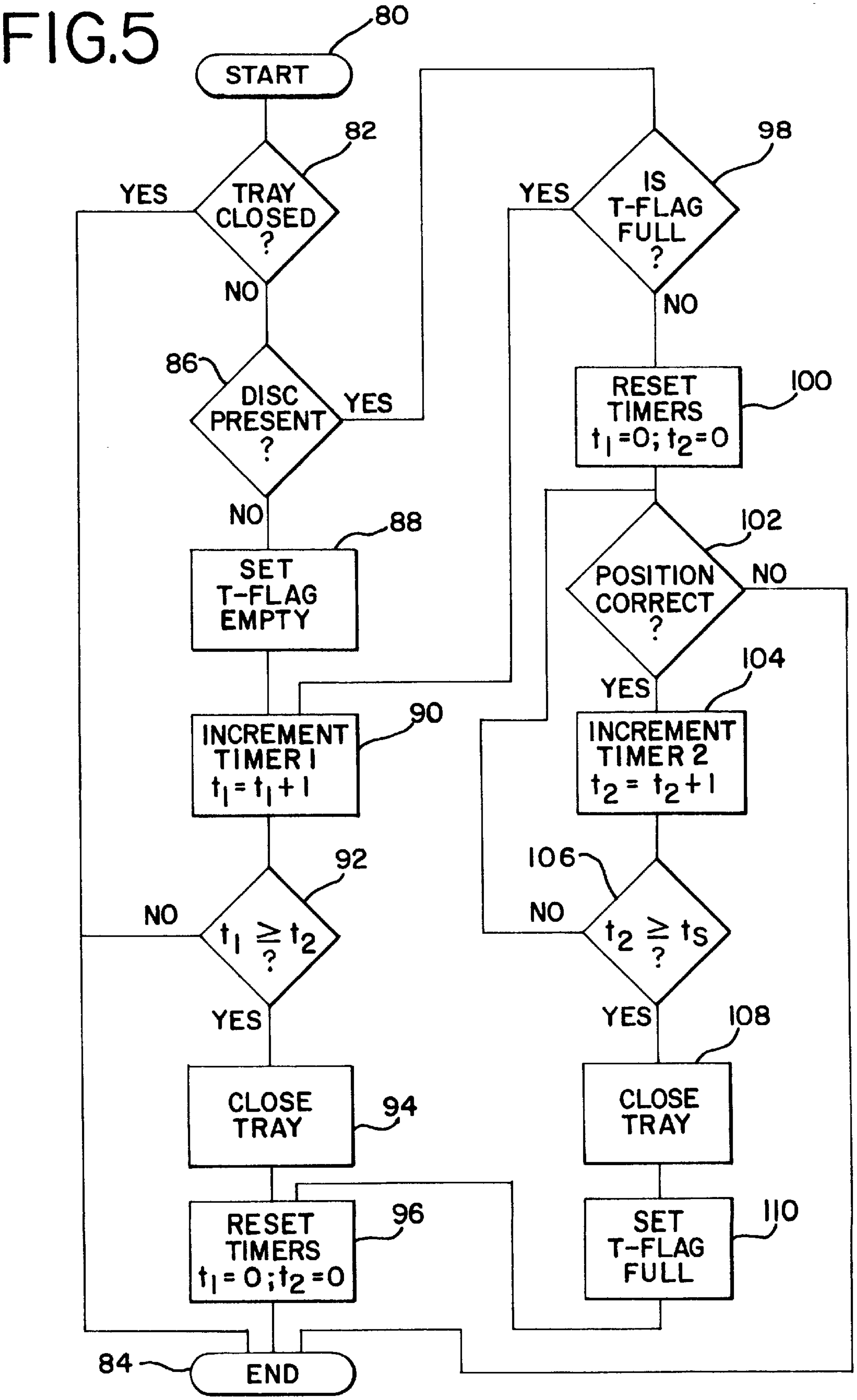
FIG. 5 is a flow diagram illustrating a routine for controlling and operating the reader of FIG. 1.

FIG. 5 is a flow chart of a routine for carrying out the state changes of FIG. 4 and for performing the automatic tray control method of the present invention. This routine is repeated at regular intervals of a very small fraction of a second under the control of the tray control microprocessor 21 (FIG. 1) of the disc reader 10 or if desired by the central processing unit 58 of the computer 54 or other data utilizing device associated with the disc reader 10.

The repetitive routine starts at block 80 of FIG. 5. In decision block 82 a determination is made whether the tray 14 is open or closed. For example a signal provided by the tray position sensor 22 may be used for this purpose. If the tray 14 is closed, the routine ends at block 84 until the next repetition of the routine. This corresponds to either the closed, empty or closed, full states of blocks 64 or 66 of FIG. 4.

Alternatively, if the tray is determined to be open at block 82, a next determination is made in a decision block 86 whether a disc is present upon the tray 14. If none of the plurality of sensors 32 senses the presence of a disc, then the tray is determined to be in the open, empty state of block 68 of FIG. 4. The FIG. 5 routine uses a status flag designated as T-FLAG to record alternatively whether the tray 14 is EMPTY or FULL. If the empty state is determined in block 86, then the T-FLAG is set to EMPTY in block 88.

A timer designated as TIMER-1 is used to generate the relatively long time delay that links blocks 68 and 84 as well as blocks 72 and 66 in FIG. 4. In block 90 of FIG. 5, this timer is incremented by one unit each time that the routine determines the state to be open, empty. Then in block 92, the TIMER-1 time $t_1$ is compared to the relatively long delay time $t_L$. For example, the relatively long delay time $t_L$ may be sixty seconds. If the delay time has not yet elapsed as determined in block 92, the routine ends in block 84. If the relatively long delay time $t_L$ has elapsed as determined in block 92, then the tray 14 is closed in block 94 and the timer TIMER-1 and a second timer TIMER-2 are reset to zero at block 96 and the routine ends at block 84.

Returning to decision block 86, if any one or more of the sensors 32 senses the presence of a disc, then it is determined that a disc is present upon tray 14. In block 98 a determination is made whether the flag T-FLAG is set to FULL or to EMPTY. If the status of the flag is FULL, then it is known that an old disc is in the tray 14 because the tray has not been flagged as empty in response to the old disc being removed from the tray. The state therefore is open, old disc, block 72 of FIG. 4. The routine moves to the long duration timer process of blocks 90–96 discussed above. If the tray remains open and loaded with an old disc, then the tray is automatically closed at block 94 after the relatively long delay period.

If the flag T-FLAG is determined to be EMPTY in block 98, the conclusion is that the disc present in block 86 is a new disc. This corresponds to the open, new disc state of block 70 of FIG. 4. In block 100, the timers TIMER-1 and TIMER-2 are reset to zero to prepare for initialization of the relatively short delay time that links blocks 70 and 66 in FIG. 4.

In block 102, a determination is made whether the disc determined to be present in block 86 is also correctly positioned. A correct position determination requires that all of the distributed sensors 32 or 2A sense disc presence. If they do not, then the routine terminates at block 84 directly from block 102 and the tray 14 cannot be automatically closed.

If the new disc is correctly positioned as determined in block 102, then a timer TIMER-2 is incremented in block 104 and a comparison is made in block 106 whether a relatively short delay time ts has elapsed. If not, then the routine returns to block 102. If the disc remains correctly positioned, the timer TIMER-2 is repetitively incremented until the relatively short time delay has elapsed. The relatively short delay time can be, for example, two seconds. If time $t_s$ has elapsed, then the tray is automatically closed in block 108 and the flag T-FLAG is set to FULL in block 110. The timers are reset in block 96 and the routine ends in block 84.

The manual pushbutton 24 overrides the routine of FIG. 5, as indicated between blocks 70 or 72 and 66 of FIG. 4. Thus whenever the pushbutton 24 is pressed while the tray is open, the tray is moved to the closed position regardless of the state of the FIG. 5 routine. Whenever the door is closed, whether automatically by the routine of FIG. 5 or manually by operation of the pushbutton, the timers TIMER-1 and TIMER-2 are reset to zero and the flag T-FLAG is set to either FULL or to EMPTY as determined by the sensors 32.

While the present invention has been described with reference to the details of the embodiment$_s$ of the invention shown in the drawing, these details are not intended to limit the scope of the invention as claimed in the appended claims.

what is claimed is:

1. A disc reader for reading data from data discs, said disc reader comprising:

a housing;

a disc loading tray supported by said housing and defining a disc receiving nest;

said tray being moveable relative to said housing between a closed position wherein said nest is located at an operating position within said housing and an open position wherein said nest is accessible from the exterior of said housing;

a sensing system carried by said tray and located at said nest for sensing when a disc is correctly positioned upon said nest, wherein said sensing system further comprises a plurality of sensing devices arrayed at spaced apart positions in said nest, and wherein the disc is correctly positioned when all of the plurality of sensing devices sense the disc; and a motor for moving said tray from said open to said closed position in response to the sensing by said sensing system of a correctly positioned disc.

2. A disc reader as claimed in claim 1, wherein said plurality of sensing devices further comprise three sensors located at regular intervals around a periphery of said nest.

3. A disc reader as claimed in claim 2, said devices comprising switches.

4. A disc reader as claimed in claim 2, said devices comprising optical sensors.

5. A disc reader as claimed in claim 1, said sensing system including a control system for operating said motor for a predetermined time after a new disc is correctly positioned in said nest.

6. A method of operating a disc reader having a housing, a tray movable in said housing between an open position and a closed position, said method comprising:

sensing the presence of a new disc correctly loaded upon the tray when the tray is open;

said sensing step including detecting the presence of the disc on the tray by a plurality of sensing devices arrayed at spaced apart positions in said tray, and wherein the disc is correctly loaded when all of the plurality of sensing devices sense the disc;

waiting a first predetermined time after correct loading of a disc; and after said waiting, moving the tray from the open to the closed position.

7. A method as claimed in claim 6, further comprising:

detecting the presence of an incorrectly positioned disc upon the tray when the tray is open; and disabling said waiting and moving steps when an incorrectly positioned disc is detected.

8. A method as claimed in claim 6, further comprising:

detecting a condition in which the tray is empty or contains an old disc;

delaying a second predetermined time while the detected condition continues; and after said delaying, moving the tray from the open to the closed position.

9. A method as claimed in claim 8 wherein said first predetermined time is shorter than said second predetermined time.

10. A computer comprising:

a housing having a user accessible mounting surface;

a disc reader for supplying data from data discs for use by the computer;

said disc reader including a disc loading tray supported by said housing and defining a disc receiving nest;

said tray being moveable relative to said housing between a closed position wherein said nest is located at an operating position within said housing and an open position wherein said nest is accessible from the exterior of said housing;

a sensing system carried by said tray and located at said nest for sensing when a disc is correctly positioned upon said nest, wherein said sensing system further comprises a plurality of sensing devices arrayed at spaced apart positions in said nest, and wherein the disc is correctly positioned when all of the plurality of sensing devices sense the disc; and a motor for moving said tray from said open to said closed position in response to the sensing by said sensing means of a correctly positioned disc.

11. A computer as claimed in claim 10, said tray having a tray front positioned generally within said user accessible mounting surface in the closed position of said tray.

12. A computer as claimed in claim 10, wherein said plurality of sensing devices further comprise three sensing devices located at regular intervals around a periphery of said nest.

13. A disc reader as claimed in claim 12, said devices comprising switches.

14. A disc reader as claimed in claim 12, said devices comprising optical sensors.

* * * * *